United States Patent
Park et al.

(10) Patent No.: US 8,468,981 B2
(45) Date of Patent: Jun. 25, 2013

(54) DUAL TYPE LANCING DEVICE OF SECONDARY SIDE OF STEAM GENERATOR

(75) Inventors: Jeong-Min Park, Seoul (KR); Chul-Hyo Kim, Ulsan (KR)

(73) Assignee: Korea Electronics Technology Institute, Gyeonggi-do (KR)

( * ) Notice: Subject to any disclaimer, the term of this patent is extended or adjusted under 35 U.S.C. 154(b) by 816 days.

(21) Appl. No.: 12/613,639

(22) Filed: Nov. 6, 2009

(65) Prior Publication Data
US 2011/0067651 A1  Mar. 24, 2011

(30) Foreign Application Priority Data

Sep. 18, 2009 (KR) ......................... 10-2009-0088700

(51) Int. Cl.
*F22B 37/48* (2006.01)
(52) U.S. Cl.
USPC .......................................... 122/379; 122/376
(58) Field of Classification Search
USPC .................. 122/379, 383; 376/260, 261
See application file for complete search history.

(56) References Cited

U.S. PATENT DOCUMENTS

| | | | | |
|---|---|---|---|---|
| 4,424,769 A | * | 1/1984 | Charamathieu et al. | 122/392 |
| 4,452,183 A | * | 6/1984 | Yazidjian | 122/392 |
| 4,620,881 A | * | 11/1986 | Booij | 134/21 |
| 4,848,278 A | * | 7/1989 | Theiss | 122/383 |
| H1115 H | * | 12/1992 | Nachbar | 165/11.1 |
| 5,638,415 A | * | 6/1997 | Nafziger et al. | 376/260 |
| 5,782,209 A | * | 7/1998 | Vandenberg | 122/379 |
| 5,782,255 A | * | 7/1998 | Magnin et al. | 134/167 R |
| 6,820,575 B2 | * | 11/2004 | Ashton et al. | 122/379 |
| 7,464,670 B2 | * | 12/2008 | Hermamdez et al. | 122/379 |
| 8,238,510 B2 | * | 8/2012 | Haberman | 376/316 |

FOREIGN PATENT DOCUMENTS

| | | |
|---|---|---|
| JP | 2000-055588 | 2/2000 |
| KR | 100708889 B1 | 11/2007 |
| KR | 100820236 B1 | 1/2008 |

OTHER PUBLICATIONS

Office Action dated Nov. 22, 2011 from Japanese Patent Application No. 2009-261425.
Korean Office Action dated May 2, 2011 for Korean application No. 10-2009-0088700.

* cited by examiner

*Primary Examiner* — Gregory A Wilson
(74) *Attorney, Agent, or Firm* — Ohlandt, Greeley, Ruggiero & Perle, LLP

(57) ABSTRACT

Provided is a lancing device in which two guide rails and washing robots are installed in both directions of a hand hole, and each washing robot removes precipitates from the center of a steam generator, and therefore precipitates do not flow backwards, thereby completely removing precipitates.

5 Claims, 6 Drawing Sheets

DUAL TYPE LANCING DEVICE OF SECONDARY SIDE OF STEAM GENERATOR

CROSS-REFERENCE TO RELATED PATENT APPLICATION

This application claims the benefit of Korean Patent Application No. 10-2009-0088700, filed on Sep. 18, 2009, in the Korean Intellectual Property Office, the disclosure of which is incorporated herein in its entirety by reference.

BACKGROUND OF THE INVENTION

1. Field of the Invention

The present invention relates to a dual type lancing device of a secondary side of a steam generator, in which two guide rails and washing robots are installed in both directions of a hand hole, and each washing robot removes precipitates from the center of a steam generator, and therefore precipitates do not flow backwards, thereby completely removing precipitates.

2. Description of the Related Art

A steam generator of a nuclear power plant is a main equipment of a nuclear plant, which generates steam for driving a turbine and a power generator by the heat-exchange of heat energy generated by a nuclear reactor, and functions as a pressure boundary for preventing radioactivity from leaking to the outside.

In nuclear plants, a turbine is operated by a force of steam generated by heating water with heat generated during the nuclear fission of uranium (Ur), and then a power generator is driven by this rotatory power so as to generate electricity. Heat pipes are closely arranged in a steam generator, while high-temperature water that is contaminated with radioactivity is flowing in the heat pipes, and low-temperature water that is not contaminated with radioactivity is flowing out of the heat pipes, heat-exchange occurs. Then, the water that is not contaminated with radioactivity is changed to steam having high-temperatures and high-pressures, and a force of this steam rotates a turbine and a power generator, thereby generating electricity.

However, since sludge accumulates in the steam generator as a time for driving the steam generator elapses, the thermal efficiency of the heat pipe of the steam generator decreases, and the heat pipes are damaged, thereby reducing the lifetime of the steam generator. If not removing iron oxide and copper oxide that are main components of the sludge, these components are condensed and adhered between the heat pipes, thereby generating a temperature stress. In addition, while the sludge is flowing together with water, the sludge may damage the heat pipes.

In order to remove sludge that adversely affects the lifetime of a steam generator, a driving method and equipment for discharging cooling water included in the steam generator during the driving the steam generator have been used. In reality, only with this method, sludge is not removed effectively, and accumulates continuously.

Accordingly, there is a need an apparatus for effectively washing the inside of a steam generator. In addition, it is required to reduce an operation time of 72 hours taken to wash the inside of a steam generator.

SUMMARY OF THE INVENTION

The present invention provides a lancing device performing a washing operation in both directions from the center of the steam generator.

In detail, the present invention provides a dual type lancing device of a secondary side of a steam generator, in which two guide rails and washing robots are installed in both directions of a hand hole, and each washing robot removes precipitates from the center of a steam generator, and therefore precipitates do not flow backwards, thereby completely removing precipitates.

According to an aspect of the present invention, there is provided a dual type lancing device of secondary side of a steam generator, including a first lancing unit comprising a first guide rail, which is installed in a first opening formed in a first side of a lower portion of the steam generator, and is formed between the first opening and a first fixation support pole, wherein both ends of the first guide rail are supported by a first mount flange and a first rail stander, and a first washing robot that is movable along the first guide rail; and a second lancing unit comprising a second guide rail, which is installed in a second opening formed in a second side of the lower portion of the steam generator, and is formed between the second opening and a second fixation support pole, wherein both ends of the second guide rail are supported by a second mount flange and a second rail stander, and a second washing robot that is movable along the second guide rail.

The first or second mount flange may support a first end of the first or second guide rail, wherein a first end of the first or second mount flange is coupled into a hand hole of the steam generator, and a second end of the first or second mount flange is used to fix the first or second guide rail, and the first or second rail stand may be shaped like a pole, for supporting the first or second guide rail, and the first and second rail stands are spaced a predetermined interval apart in a perpendicular direction to the first and second fixation support poles.

Each of the first and second washing robots may include a moving unit comprising a first meter gear mounted on an axis of a first direct current (DC) servo motor so as to rotate, a pair of spur gears that is engaged with the first meter gear so as to rotate and is formed high and low, and a rack gear that is formed on an axis on which the spur gear formed high is disposed, and is engaged with the first or second guide rail, wherein the moving unit moves the first or second washing robot back or forth along the first or second guide rail; and a nozzle unit comprising a second meter gear installed in one side of the moving unit and mounted on an axis of a second direct current (DC) servo motor so as to rotate, and a robot meter gear that is shaped like a semi-circumference and rotates along a circumference, wherein the nozzle unit rotates the first or second washing robot.

A nozzle may be formed at a front end of the nozzle unit, and a camera and a lamp may be installed at a rear end of the nozzle. The first and second guide rails may be coupled to the first and second washing robots, respectively, by using a dove tail method. The first and second washing robots may include a remote control unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
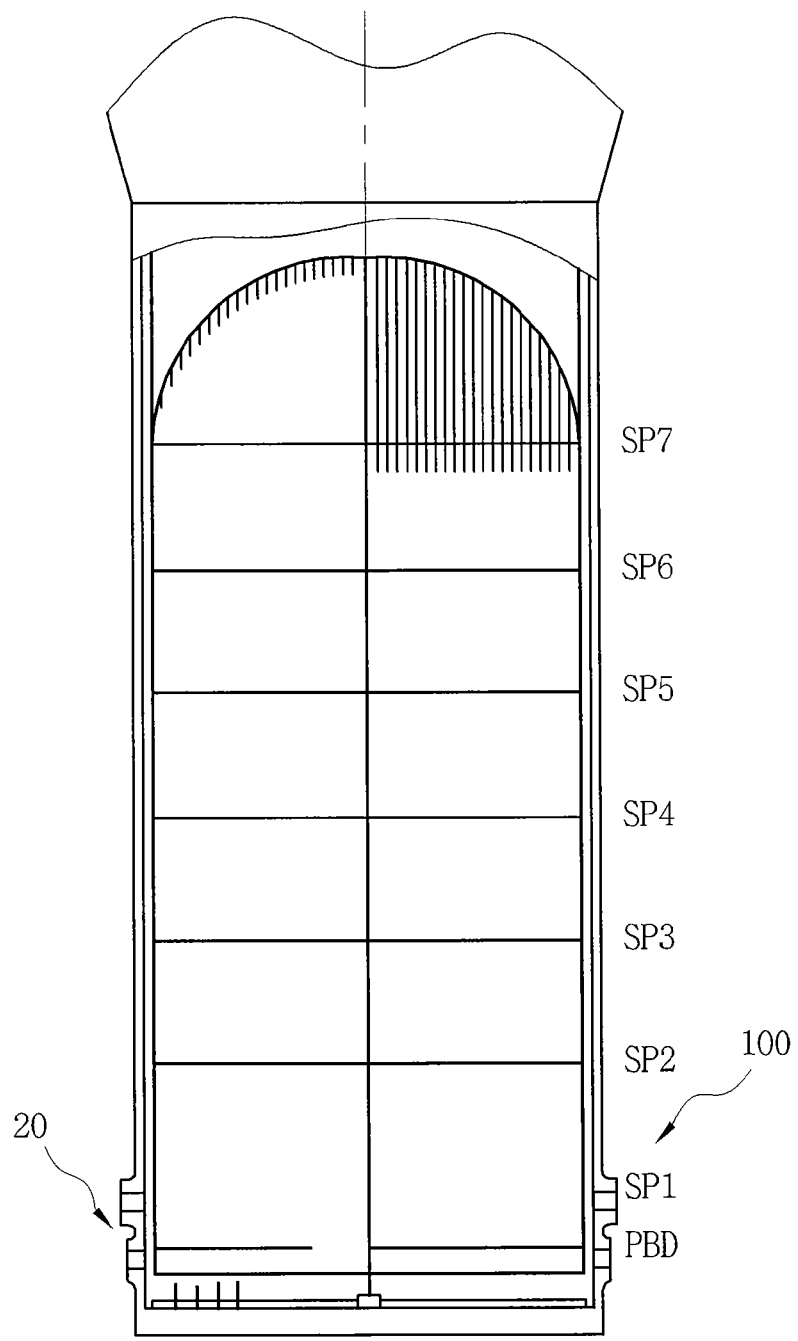
FIG. 1 is a diagram of a steam generator according to an embodiment of the present invention.

FIG. 1 is a diagram of a steam generator 10 according to an embodiment of the present invention.

The steam generator 10 is a main equipment of a nuclear plant, which generates steam for driving a turbine and a power generator by the heat-exchange of heat energy generated by a nuclear reactor, and functions as a pressure boundary for preventing radioactivity from leaking to the outside.

A dual type lancing device of secondary side of a steam generator according to an embodiment of the present invention is provided in order to periodically remove iron oxide accumulating on a tube sheet of the steam generator 10, and includes a guide rail and a washing robot, which are formed in each hand hole formed in the steam generator 10 through an opening thereof. While being moved, the washing robot coupled to the guide rail is injecting high-pressure washing water, and thus the washing robot removes precipitates accumulating in the steam generator 10.

According to the present embodiment, the dual type lancing device of secondary side of a steam generator includes a first lancing device including a guide rail and a washing robot, which are formed from a hand hole to the center of the first lancing device, and a second lancing device including a guide rail and a washing robot, which are formed from an opposite hand hole to the center of the second lancing device. The structure and driving method of the first lancing device are the same as those of second lancing device, and thus the structure and driving method will be described with regard to only one lancing device.

Figure 2:
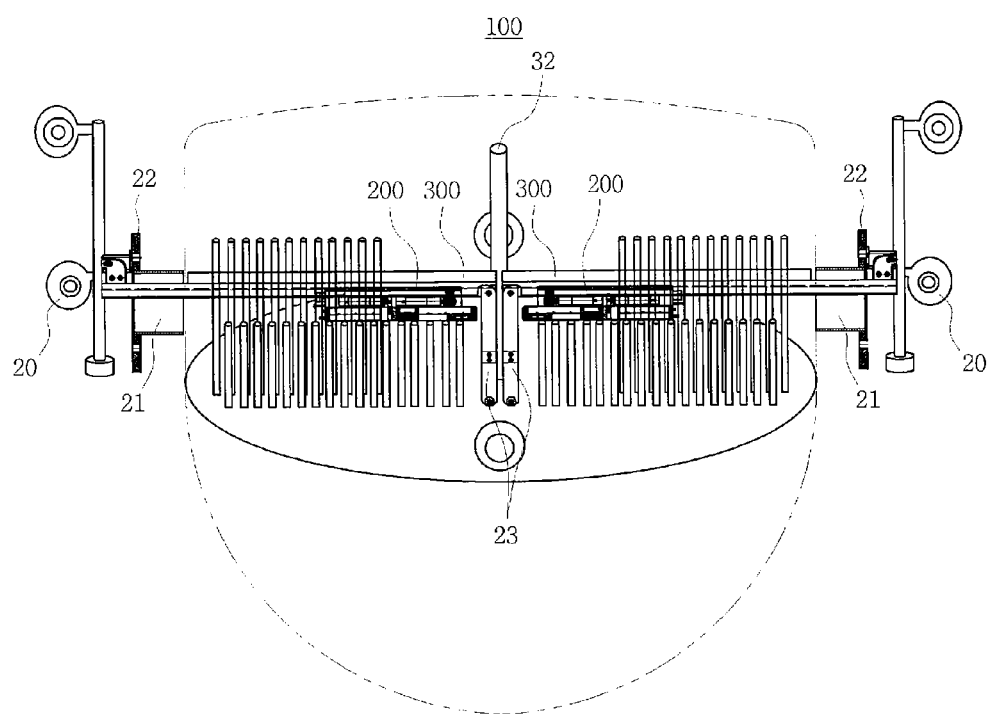
FIG. 2 is a front view of a case where a washing robot is coupled to a guide rail, according to an embodiment of the present invention.
Figure 3:
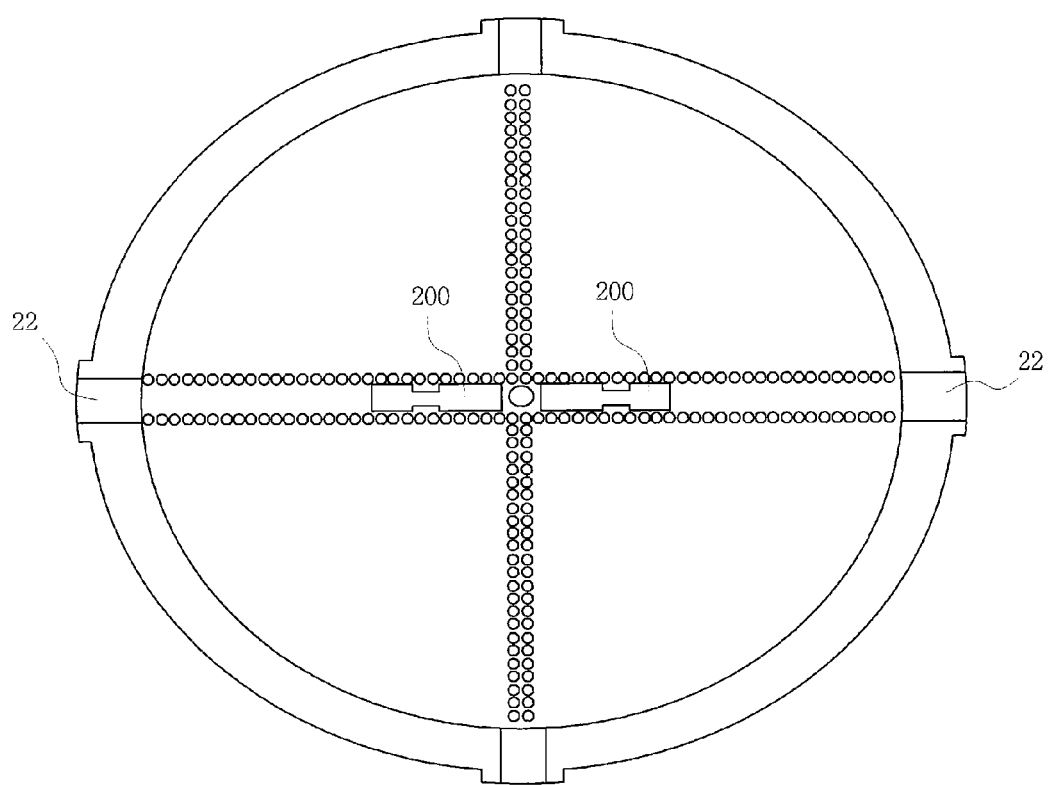
FIG. 3 is a plan view of a case where the washing robot of FIG. 2 is coupled to the guide rail of FIG. 2, according to an embodiment of the present invention.

FIG. 2 is a front view of a case where a washing robot is coupled to a guide rail, according to an embodiment of the present invention. FIG. 3 is a plan view of a case where the washing robot of FIG. 2 is coupled to the guide rail of FIG. 2, according to an embodiment of the present invention.

Referring to FIG. 2, a dual type lancing device 100 of a secondary side of a steam generator includes mount flanges 22 disposed in respective hand holes 21 formed in openings 20 formed at lower portions of the steam generator, and two rail standers 23 formed on a central portion of the steam generator.

A first end of the mount flange 22 is fixed to an upper end of the hand hole 21, and a second end of the mount flange 22 is used to fix a first end of the guide rail by using a connection member. The rail standers 23 are each shaped like a pole, for supporting a second end of the guide rail, and are spaced a predetermined interval apart in a perpendicular direction to a fixation support pole 32.

As illustrated in FIG. 3, by installing two or more washing robots 200 on a first guide rail and a second guide rail that are fixed to the rail stander 23 and an upper end of the mount flange 22, two lancing devices simultaneously perform a washing operation with respect to the steam generator as the center, thereby halving a conventional washing time.

Figure 4:
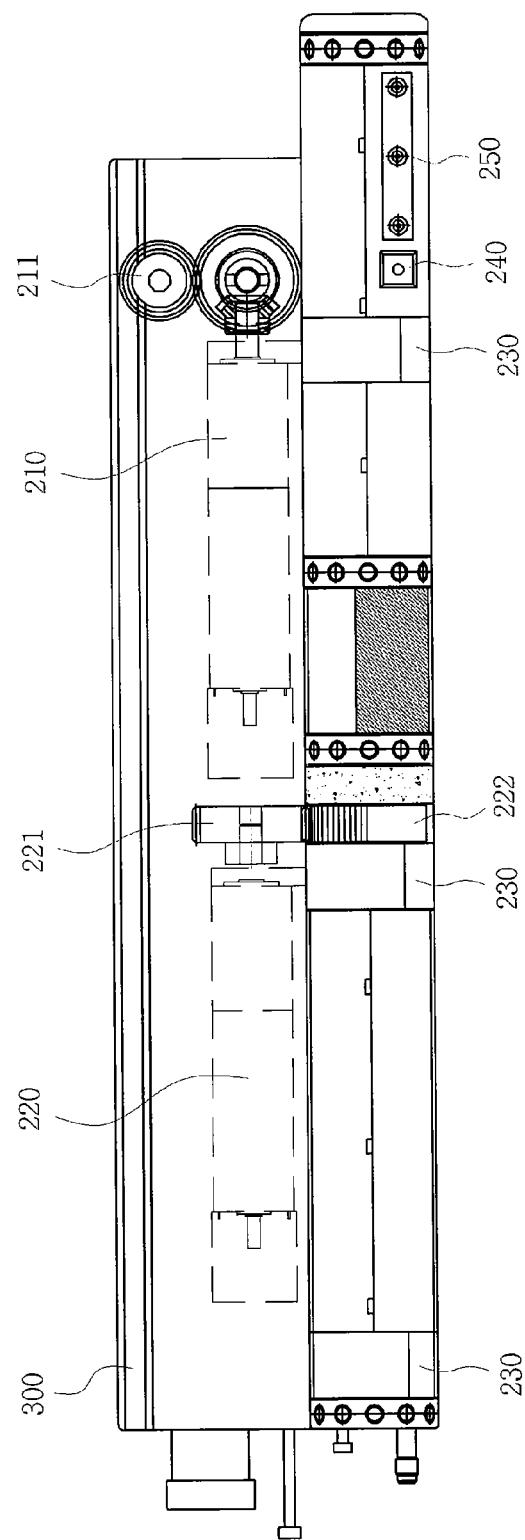
FIG. 4 is a cross-sectional view of a washing robot according to an embodiment of the present invention.
Figure 5:
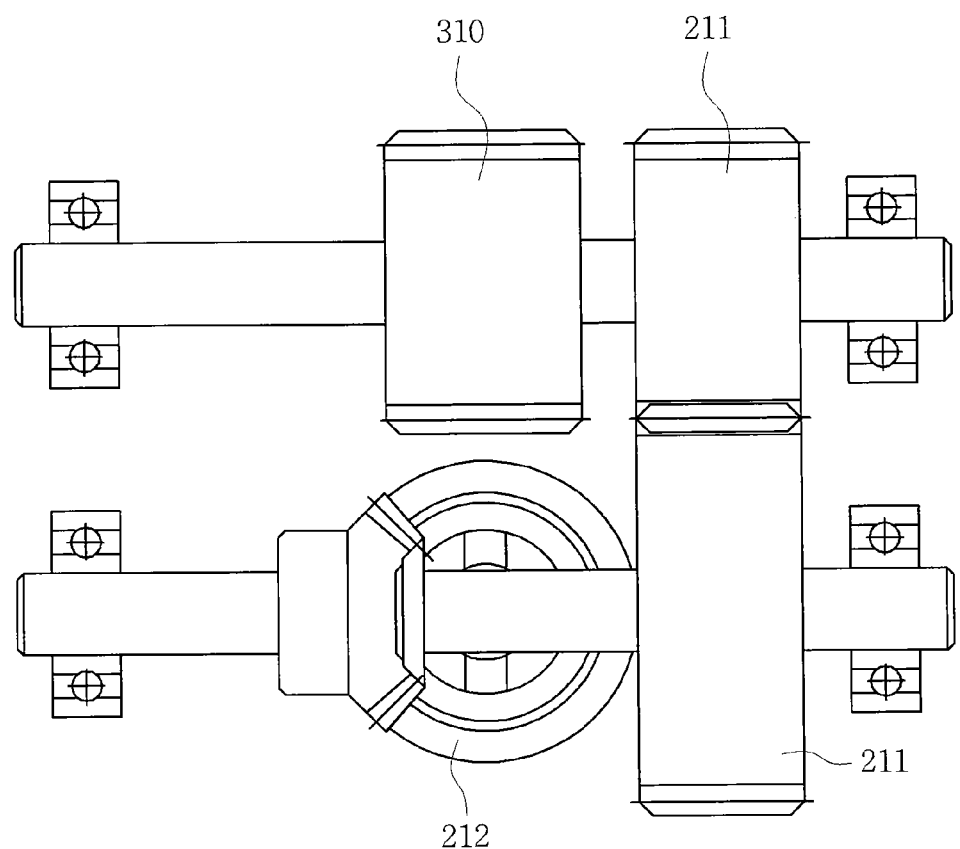
FIG. 5 is a cross-sectional view for explaining an operation of a moving unit of the washing robot of FIG. 4, according to an embodiment of the present invention.
Figure 6:
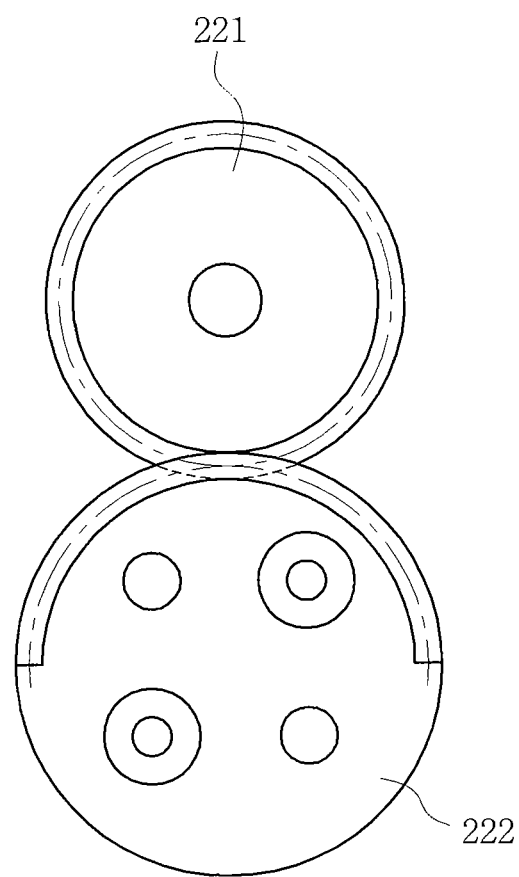
FIG. 6 is a cross-sectional view for explaining an operation of a nozzle unit, according to an embodiment of the present invention.

FIG. 4 is a cross-sectional view of a washing robot 200 according to an embodiment of the present invention. FIG. 5 is a cross-sectional view for explaining an operation of a moving unit of the washing robot 200 of FIG. 4, according to an embodiment of the present invention. FIG. 6 is a cross-sectional view for explaining an operation of a nozzle unit, according to an embodiment of the present invention.

The washing robot 200 is movable back and forth along a guide rail 300, and removes precipitates by rotating a nozzle. Thus, the washing robot 200 will be described in terms of this technical feature.

The washing robot 200 includes the moving unit and the nozzle unit. The moving unit is configured to move the washing robot 200 back and forth along the guide rail 300, and the nozzle unit is configured to reciprocate the washing robot 200.

The moving unit of the washing robot 200 is configured so that the washing robot 200 is driven by a first direct current (DC) servo motor 210 so as to be movable back and forth along the guide rail 300. As illustrated in FIG. 5, a first meter gear 212 mounted on an axis of the first DC servo motor 210 is engaged with a pair of spur gears 211 formed high and low so as to rotate.

A rack gear 310, which is formed on an axis on which the spur gear 211 formed high is disposed and receives a driving force from the spur gear 211, is engaged with the spur gear 211 so as to rotate, and simultaneously moves the washing robot 200 back and forth.

Then, the washing robot 200 is driven by a second direct current (DC) servo motor 220 so that a nozzle 250 rotates so as to remove precipitates. About 250 bar of washing water is ejected from the nozzle 250 formed in the washing robot 200, and a plurality of the nozzles 250 are formed in order to perform a washing operation. According to an embodiment of the present invention, three nozzles 250 are arranged in two lines in the washing robot 200, and a rotation degree of the nozzle 250 is in the range of about ±74 to about ±85 degrees.

The nozzle unit of the washing robot 200 includes the second DC servo motor 220 installed in the moving unit, a second meter gear 221 mounted on an axis of the second DC servo motor 220, and a robot meter gear 222 that is disposed at a lower end of the second meter gear 221 and is engaged with the second meter gear 221 so as to be driven.

As illustrated in FIG. 6, the robot meter gear 222 is shaped like a semi-circumference, and is engaged with the second meter gear 221. Thus, a body of the washing robot 200 is moved along a circumference, and ejects a high-temperature water though the nozzles 250.

In addition, a nozzle is formed in a surface of an end of the body of the washing robot 200, which is coupled to the washing robot 200, and a camera and a lamp are installed at a rear end of the nozzle. A supply hose (not shown) for supplying the high-pressure washing water is connected to the nozzle unit.

A plurality of bushings 230 are formed on both surfaces of the robot meter gear 222 of the washing robot 200 so as to support motors driving the moving unit and the nozzle unit. A guide peace is formed on the bushing 230 so that the guide peace is coupled to the body of the washing robot 200 including the moving unit by using a dove tail method. Likewise, when a dove tail method is used, an adhesive force between elements is so strong that the elements are not separated from each other, and it is simple to couple the elements.

In addition, according to the present embodiment, the washing robot 200 and the guide rail 300 are coupled to each other by using a dove tail method.

The washing robots 200 are formed in the respective openings which are formed in both directions of the steam generator. Since it is possible to simultaneously control two washing robots 200, a washing time is remarkably reduced. Conventionally, when a washing operation is performed in a single direction, precipitates may flow backwards. On the other hand, according to the present embodiment, this problem is overcome.

The dual type lancing device of secondary side of a steam generator according to the present embodiment includes a remote control unit and a local control system, thereby improving thereby improving convenience for a user, which will be described.

The remote control unit is installed in a local operation office out of a housing container of a unclear plant so as to remotely control a washing robot. The remote control unit receives information regarding an operation of the washing robot and video information from the local control system, and provides the information and the video information to a user.

In order to remotely control the washing robot, a camera 240 and a lamp (not shown) are formed at a rear end of the nozzle 250 of the washing robot 200. Information regarding injection of the steam generator and movement of the washing robot, which are recorded by the camera 240, are tabled. In detail, the position of the washing robot and the rotation degree of the nozzle of the washing robot are tabled so as to be provided to a user.

An endoscope camera may be used as an example of the camera 240.

Accordingly, an operation of the washing robot is controlled by the local control system and the remote control unit, and high-pressure washing water is transferred through the supply hose to the nozzle of the washing robot by a high-pressure pump installed in a precipitate processing unit so as to be ejected between heating pipes.

A closed circulation operation is performed by transferring precipitates, which are washed away out of both directions along a circumference of the steam generator, to the precipitate processing unit through a collection pump and a hose, filtering only precipitates by a filter so that clean washing water remains, and then transferring the clean washing water to the washing robot through the high-pressure pump.

According to the dual type lancing device of secondary side of a steam generator according to the present embodiment, a washing time is reduced by forming two washing robots that are movable back and forth and formed at lower portions of the steam generator. Conventionally, when a washing operation is performed in a single direction, precipitates may flow backwards. On the other hand, according to the present embodiment, this problem is overcome.

In addition, it is possible to remotely and locally control a washing robot, and thus the washing position of the washing robot and the rotation degree of the nozzle may be known, thereby reducing a wording time of a user, and improving user's working efficiency.

According to a dual type lancing device of secondary side of a steam generator according to the present invention, two washing robots simultaneously perform a washing operation, and thus a washing time is reduced.

Moreover, the dual type lancing device of secondary side of a steam generator may be used in all kinds of steam generators of a nuclear plant, and thus high compatibility may be obtained.

In addition, it is possible to remotely control a washing robot, and the position and state of the washing robot may be known by a lam and a camera which are installed in the washing robot, thereby improving user's working efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dual type lancing device of secondary side of a steam generator, comprising:
   a first lancing unit comprising a first guide rail, which is installed in a first opening formed in a first side of a lower portion of the steam generator, and is formed between the first opening and a first fixation support pole, wherein both ends of the first guide rail are supported by a first mount flange and a first rail stander, and a first washing robot that is movable along the first guide rail; and
   a second lancing unit comprising a second guide rail, which is installed in a second opening formed in a second side of the lower portion of the steam generator, and is formed between the second opening and a second fixation support pole, wherein both ends of the second guide rail are supported by a second mount flange and a second rail stander, and a second washing robot that is movable along the second guide rail,
   wherein each of the first and second washing robots comprises:
   a moving unit comprising a first meter gear mounted on an axis of a first direct current (DC) servo motor so as to rotate, a pair of spur gears that is engaged with the first meter gear so as to rotate and is formed high and low, and a rack gear that is formed on an axis on which the spur gear formed high is disposed, and is engaged with the first or second guide rail, wherein the moving unit moves the first or second washing robot back or forth along the first or second guide rail; and
   a nozzle unit comprising a second meter gear installed in one side of the moving unit and mounted on an axis of a second direct current (DC) servo motor so as to rotate, and a robot meter gear that is shaped like a semi-circumference and rotates along a circumference, wherein the nozzle unit rotates the first or second washing robot.

2. The dual type lancing device of secondary side of the steam generator of claim 1, wherein the first or second mount flange supports a first end of the first or second guide rail,
   wherein a first end of the first or second mount flange is coupled into a hand hole of the steam generator, and a second end of the first or second mount flange is used to fix the first or second guide rail, and
   wherein the first or second rail stand is shaped like a pole, for supporting the first or second guide rail, and the first and second rail stands are spaced a predetermined interval apart in a perpendicular direction to the first and second fixation support poles.

3. The dual type lancing device of secondary side of the steam generator of claim 1,
   wherein a nozzle is formed at a front end of the nozzle unit, and a camera and a lamp are installed at a rear end of the nozzle.

4. The dual type lancing device of secondary side of the steam generator of claim 1, wherein the first and second guide rails are coupled to the first and second washing robots, respectively, by using a dove tail method.

5. The dual type lancing device of secondary side of the steam generator of claim 1, wherein the first and second washing robots comprise a remote control unit.

* * * * *